(12) United States Patent
Frank et al.

(10) Patent No.: US 6,532,494 B1
(45) Date of Patent: Mar. 11, 2003

(54) CLOSED-LOOP NODE MEMBERSHIP MONITOR FOR NETWORK CLUSTERS

(75) Inventors: Richard L. Frank, Groton, MA (US); Michael J. Cusson, Chelmsford, MA (US); Joydip Kundu, Nashua, NH (US); Daniel E. O'Shaughnessy, Hollis, NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/321,998

(22) Filed: May 28, 1999

(51) Int. Cl.[7] .............................................. G06F 13/00
(52) U.S. Cl. .................................................... 709/224
(58) Field of Search ................................ 709/200, 201, 709/224, 220, 221, 239, 251, 252, 253

(56) References Cited

U.S. PATENT DOCUMENTS

| | | | | |
|---|---|---|---|---|
| 5,559,794 A | * | 9/1996 | Willis et al. ................... | 370/13 |
| 5,737,311 A | * | 4/1998 | Wyld ........................... | 370/227 |
| 5,959,972 A | * | 9/1999 | Hamami ....................... | 370/216 |
| 5,986,783 A | * | 11/1999 | Sharma et al. ............... | 359/119 |
| 5,999,712 A | * | 12/1999 | Moiin et al. .................. | 709/220 |
| 6,028,862 A | * | 2/2000 | Russell et al. ............... | 370/397 |
| 6,046,833 A | * | 4/2000 | Sharma et al. ............... | 359/119 |
| 6,130,876 A | * | 10/2000 | Chaudhuri .................... | 370/228 |
| 6,198,721 B1 | * | 3/2001 | Muller ......................... | 370/223 |

* cited by examiner

*Primary Examiner*—Moustafa M. Meky
(74) *Attorney, Agent, or Firm*—Hamilton, Brook, Smith & Reynolds, P.C.

(57) ABSTRACT

A quorumless network cluster provides a highly available system by addressing the partition-in-space and partition-in-time problems in network clusters.

In a particular solution, a cluster manager (CM) can use disk based messaging to manage the operation of the cluster. Each node within the cluster must have access to a shared disk to operate within the cluster.

A particular methodology can operate the cluster in a closed loop between nodes 1 to N. If a node fails to receive a heartbeat message from its predecessor in the loop, it initiates a cluster reconfiguration by sending a reconfiguration message to each other node in the cluster.

The quorumless cluster can also include a common storage for a cluster definition. Each node may provide a proposed change to the cluster definition, however only a single coordinator node may update the cluster definition and apply the suggested changes.

52 Claims, 7 Drawing Sheets

CLOSED-LOOP NODE MEMBERSHIP MONITOR FOR NETWORK CLUSTERS

RELATED APPLICATIONS

This application discloses subject matter also disclosed in the following copending applications:

U.S. application Ser. No. 09/321,090, filed May 28, 1999, entitled A QUORUMLESS CLUSTER USING DISK-BASED MESSAGING, by Richard Frank, Michael Cusson, Joydip Kundu, and Daniel E. O'Shaughnessy, inventors, still pending;

U.S. application Ser. No. 09/322,472, filed May 28, 1999, entitled USING A CLUSTER-WIDE SHARED REPOSITORY TO PROVIDE THE LATEST CONSISTENT DEFINITION OF THE CLUSTER (AVOIDING THE PARTITION-IN-TIME PROBLEM), by Joydip Kundu, Richard Frank, Michael Cusson and Daniel E. O'Shaughnessy, inventors, still pending; and U.S. application Ser. No. 09/321,967, filed May 28, 1999, entitled PROVIDING FIGURE OF MERIT VOTE FROM APPLICATION EXECUTING ON A PARTITIONED CLUSTER, by Richard Frank, Michael Cusson, Joydip Kundu, and Daniel E. O'Shaughnessy, inventors, still pending.

The entire teachings of the aforementioned, copending applications are incorporated herein by reference.

BACKGROUND

As is known in the art, a computer network cluster is a collection of interconnected computers which share resources such as data storage. The individual computers, or nodes, are connected through both a physical and a software-level interconnect. The independent nodes are integrated into a single virtual computer, appearing to an end user as a single computing resource. If one node fails, the remaining nodes will handle the load previously handled by the failed node. This multiple computer environment provides many benefits to a user including high availability and increased speed of operation.

A typical network cluster configuration includes a plurality of nodes typically sharing one or more storage devices. The nodes are connected to each other by a high speed network connection such as ethernet.

A user can connect into the network cluster through any of the nodes in the network cluster. From the perspective of a user, the network cluster appears as a single computer system. Software applications run by a user are executed using the shared storage devices. An exemplary software application often executed on a computer network cluster is a database application. Typically, the database is stored on one or more shared storage devices. Inquiries or changes to the database are initiated by a user through any one of the cluster member nodes.

Successful operation of a network cluster requires coordination among the nodes with respect to usage of the shared resources as well as with respect to the communication between the nodes. Specifically, with multiple users manipulating shared data, precautions must be taken in a network cluster to insure the data is not corrupted. In addition, instances of nodes joining and exiting the network cluster must also be coordinated to avoid a loss of system integrity. Multiple safeguards have been instituted to aid in the prevention of a loss of system integrity.

One such safeguard involves each node of the network cluster periodically informing each other node that it is operating and is still a member of the network cluster. This is typically accomplished by sending a message, generally known as a heartbeat message, from each node in the network cluster to each other node in the cluster.

If a first node fails to receive a message from a second node it regards as a member of the cluster, the first node signals the remaining nodes that cluster membership should be re-evaluated. The failure of the first node to receive the message may be indicative of the second node losing network connectivity with the first node. In an effort to resolve the network interconnectivity of the nodes, all user applications being executed on the network cluster are stalled and multiple messages are transferred among the member nodes. As a result of this messaging activity, the network interconnectivity of each member node is assessed.

SUMMARY

The safeguard described above provides a limited solution to the problem described. For instance providing a heartbeat message from each node in the cluster to each other member node in the cluster creates considerable messaging traffic. In an N node cluster, $(N-1)^2$ messages are sent at each specified time interval thus using valuable system resources.

The present system includes a method and an apparatus for operating a network cluster in a closed loop between node_1 to node N. Each node sends a single heartbeat message to the node ahead of it in the loop, i.e., node_1 sends a heartbeat message to node_2, node_2 to node_3, etc. Here, each node sends and receives a single message. If a node fails to receive a heartbeat message from its predecessor in the loop, it initiates a cluster reconfiguration by sending a reconfiguration message to each other node in the cluster. By operating the cluster in a closed loop, heartbeat message traffic is greatly reduced thus freeing valuable system resources.

BRIEF DESCRIPTION OF THE DRAWINGS

The foregoing and other objects, features and advantages of the invention will be apparent from the following more particular description of Avoiding N-Squared Heartbeat Messaging Problem in an Operating Cluster Via Closed Loop Messaging Theme, as illustrated in the accompanying drawings in which like reference characters refer to the same parts throughout the different views. For clarity and ease of description, the drawings are not necessarily to scale, emphasis instead being placed upon illustrating the principles of the invention.

DETAILED DESCRIPTION OF THE INVENTION

Figure 1:
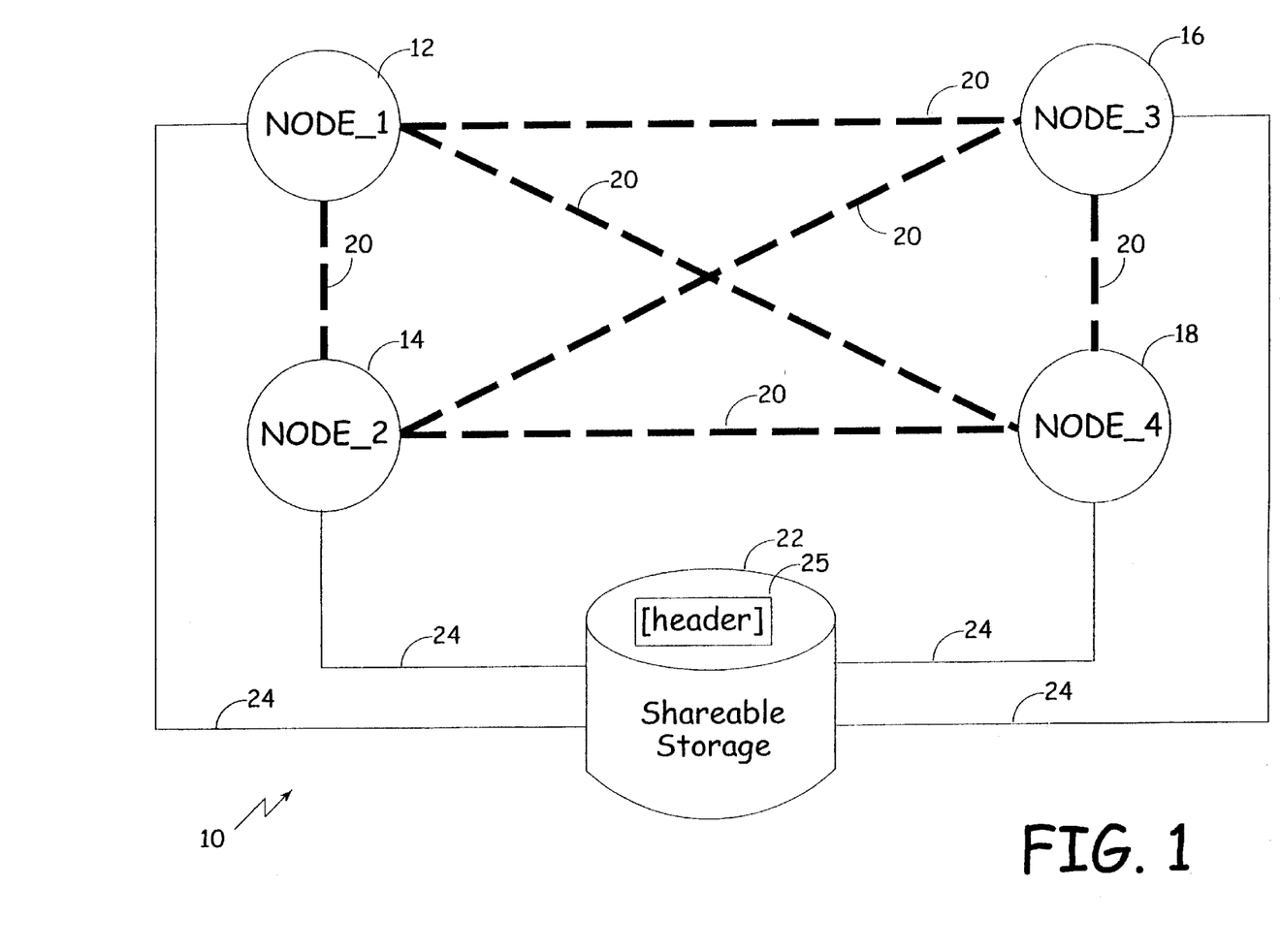
FIG. 1 is a diagram of a quorumless computer network cluster operating in accordance with the present system.

FIG. 1 is a diagram of a quorumless computer network cluster operating in accordance with the present system. It should be understood that a quorumless network cluster 10 can have any number of nodes. As illustrated, an example quorumless network cluster 10 is shown as having four nodes, node_1 12, node_2 14, node_3 16 and node_4 18 connected to each other through a high speed network connection 20. The four nodes 12, 14, 16, 18 are further connected to shareable storage 22 through a storage connection 24. In the quorumless network cluster 10, access and membership in the cluster is predicated on an individual node having access to the shareable storage 22.

According to a certain embodiment of the invention, a computer network cluster can form if one of the four nodes 12, 14, 16, 18 has access to the shareable storage 22. As described in the background, previous network clusters required a quorum of nodes to be available to form a cluster. That is, if four nodes were approved members of a cluster, at least three of the nodes, (N+1)/2 where N is the number of nodes permissibly in the cluster, must be operating as members in the cluster for the cluster to continue operation.

Here, contrary to a traditional quorum cluster, a single node can form a cluster. The single node, for example, node_1 12, can access the shareable storage 22, extract cluster definition data from the storage, as will be described in detail below, and form a computer network cluster. At a later time, node_2 14, node_3 16 and node_4 18 can join the already established cluster. Moreover, if node_2 14, node_3 16 and node_4 18 subsequently exit the cluster, the cluster may continue to operate even though fewer than a quorum of nodes is in current operation in the cluster. Such an arrangement can increase availability of the cluster to a user by minimizing shutdowns of the computer network cluster initiated by fewer than a quorum of nodes being in operation.

Here, shareable storage 22 has been illustrated as a single storage disk or the like. It should be understood by one of ordinary skill in the art that the shareable storage may include multiple storage devices. To implement multiple storage devices as the shareable storage 22, a header 25 of each storage device may include data indicating the identity of all devices comprising the shareable storage 22, a version number for information contained in the header 25, and any other pertinent data. To gain membership in the quorumless cluster 10, a node must have access to all storage devices comprising the shareable storage 22.

To determine whether, for instance node_1 12, has access to all storage devices, node_1 accesses the information contained in the header in the storage device it believes to be part of the quorumless cluster 10. Assume that two storage devices comprise the shareable storage 22, disk A and disk B (not shown). The header of each disk would include a label (A, B, 1) indicating that disk A and disk B are members of the valid storage set and that this definition is version 1. Node_1 12 accesses the information contained in the header of disk A and realizes that to join the quorumless cluster 10 it needs to have access to both disk A and disk B. Disk B's header information can be accessed to verify that the valid storage set had not been altered.

During subsequent operation of the quorumless cluster 10, one or more of the member nodes 12, 14, 16, 18 may lose access to disk A. In such a case, it may be decided by the member nodes 12, 14, 16, 18 of the quorumless cluster 10 to drop disk A from the cluster. The header information in disk B is edited to read (_, B, 2) indicating that only disk B comprises the shareable storage 22 and that this is the second version of the valid storage set. If another node attempted to join the cluster at this time it could access the header file in disk A which indicates that access to both disk A and disk B is required to gain membership in the cluster 10. If the node did not have access to disk B it would not be able to join the quorumless cluster 10. If the node checked the header information in disk B it would correctly determine that only access to disk B is required to join the quorumless cluster 10.

Typically, communications on the computer network cluster 10 are directed by logical layers of software. These software layers reside on each individual node. Corresponding layers communicate with peer layers on other nodes within the computer network cluster 10 to coordinate activities of the nodes. Here, the layers of software which are of specific interest are the cluster (or communication) manager, (CM), the distributed lock manager, (DLM), and a distributed software application.

Figure 2:
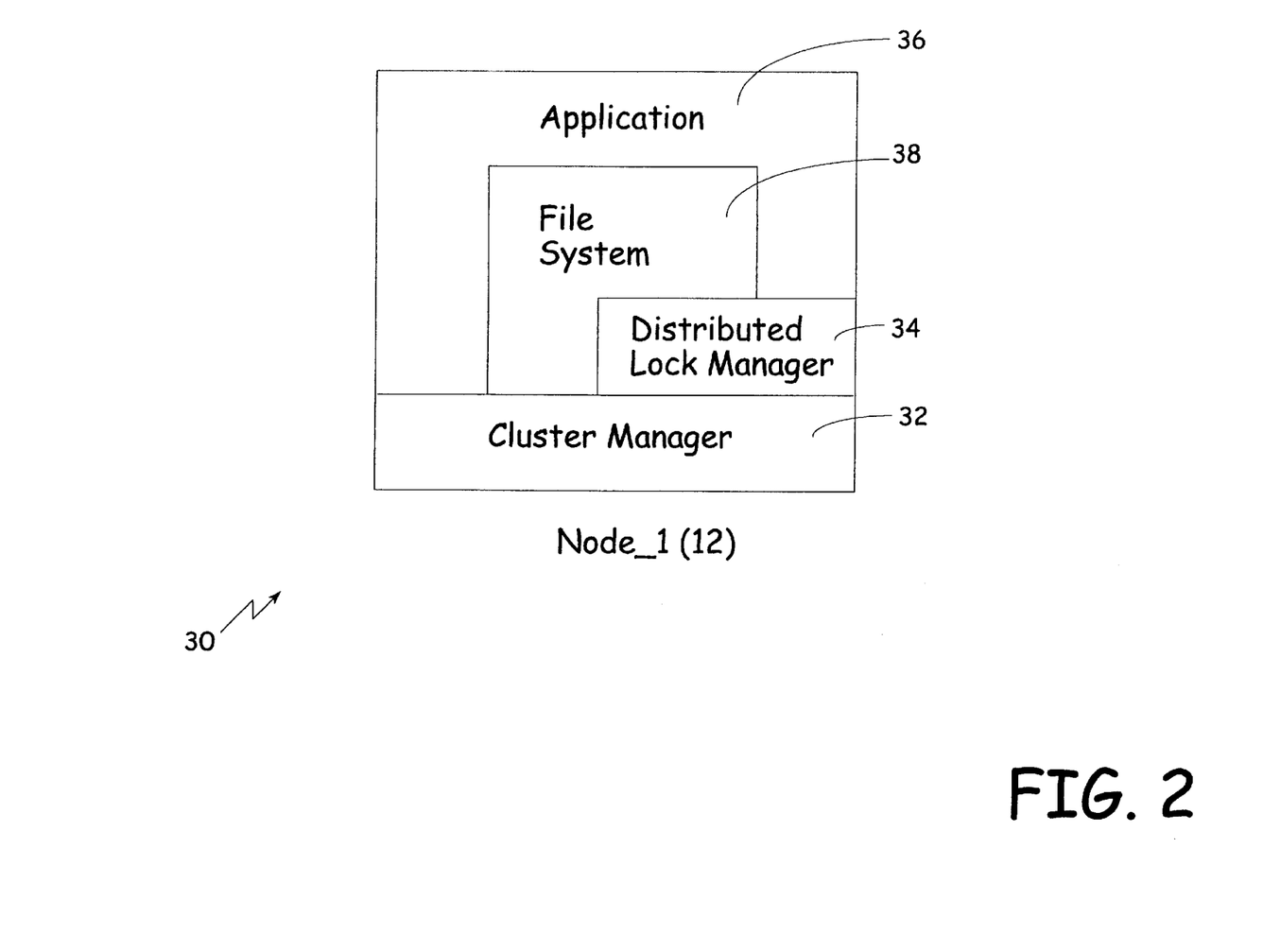
FIG. 2 is a diagram depicting a relationship between multiple software components residing on each node of the quorumless computer network cluster of FIG. 1.

FIG. 2 is a diagram depicting a relationship between multiple software components residing on each node of the quorumless computer network cluster of FIG. 1. Referring now to FIG. 2, a block diagram 30 is shown depicting a representation of some of the software layers residing on node_1 12. It should be noted that the layers depicted on node_1 12 have counterparts on each of the remaining nodes 14, 16, 18 of the network cluster 10. A cluster manager 32, a distributed lock manager 34 and a distributed application 36 are shown to reside on node_1 12. As shown, the cluster manager 32 may operate in concert with the distributed lock manager 34 and the distributed application. That is, the distributed application 38 and the DLM 34 of node_1 12 use the services provided by the cluster manager 32 while executing on node_1 12.

Specifically, the cluster manager 32 manages cluster connectivity in the computer network cluster 10. For example, the cluster manager 32 can oversee the addition of nodes to and removal of nodes from the computer network cluster 10. It can also prevent the cluster 10 from partitioning into multiple cluster partitions. In addition, as an entity, such as an application or distributed lock manager, begins operating on node_1 12 and within the quorumless cluster 10, the entity may register with the cluster manager 32. Registration with the cluster manager 32 signifies that the entity requests that changes in cluster membership, among other things, be communicated to the entity by the cluster manager 32.

The distributed lock manager 34 synchronizes operations between the nodes on shared resources. Supervision of shared resources by the DLM 34 is voluntary. Distributed applications request the DLM 34 to coordinate access by the applications to shared resources.

Specifically, the distributed application 36 requests the DLM 34 to synchronize its operations on shared resources with operations of peer distributed applications on other nodes. Here, an exemplary shared resource is the file system 38. That is, the distributed application 36 may have access to file systems (not shown) residing on other nodes 14, 16, 18 as distributed applications residing on other nodes 14, 16, 18 may have access to the file system 38 residing on node_1 12. The DLM 34 locks out distributed applications of the other nodes 14, 16, 18 from the shared resource 38 while the distributed application 36 is using the resource.

In addition, data residing on the shareable storage device 22 of FIG. 1 may also be shared by the multiple distributed applications. The DLM 34 of node_1 12 locks out distributed applications of the other nodes 14, 16, 18 from data being accessed by the distributed application of node_1 12 within the shareable storage device 22. Accordingly, only a single application may be using a shared resource at a single time.

As described above, the cluster manager 32 manages the cluster connectivity. One aspect of managing the connectivity of the cluster is monitoring the membership of the cluster. Specifically, the cluster manager 32 manages cluster integrity when nodes are added to or removed from the cluster.

Figure 3:
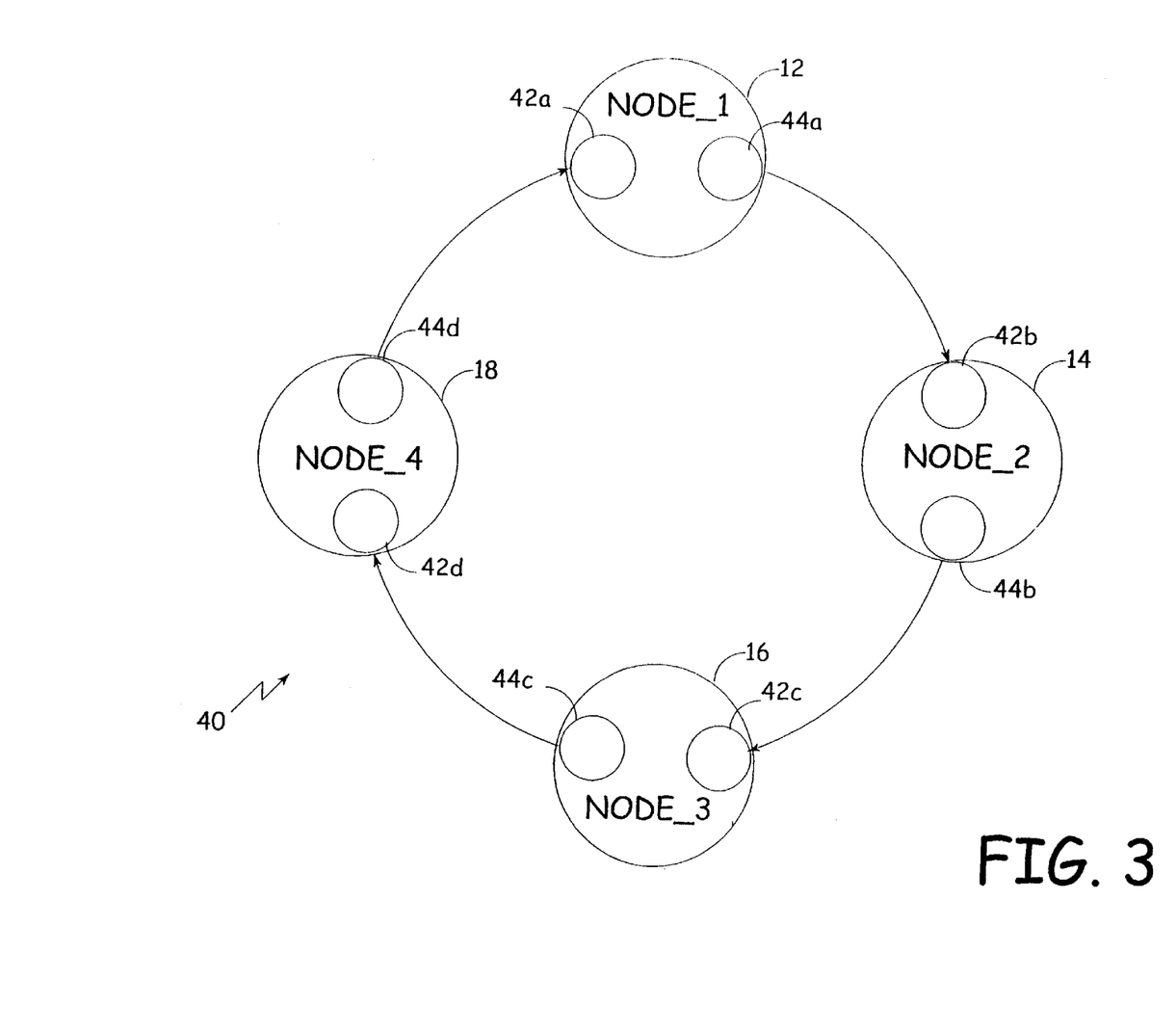
FIG. 3 is a diagram representing the exchange of heartbeat messages between the nodes of the quorumless computer network cluster of FIG. 1.

FIG. 3 is a diagram representing the exchange of heartbeat messages between the nodes of the quorumless computer network cluster of FIG. 1. Referring now to FIG. 3, a logical arrangement of the nodes 12, 14, 16, 18 of the computer network cluster 10, here referred to as a status cascade 40, is shown which facilitates monitoring membership of the quorumless cluster 10. As discussed previously, nodes in a computer network cluster continually monitor the other nodes in the cluster to know whether another node has ceased operation within the cluster. As a means for monitoring the membership status of the nodes in the cluster, heartbeat messages are sent from each node to each other node in the cluster. If a node failed to receive a heartbeat message from one of the other nodes within a predetermined time interval, the cluster would enter reconfiguration mode. In reconfiguration mode, all user applications executing on the network cluster are stalled until the cluster membership is once again verified.

In the prior art arrangement, it would be common for a cluster to require each node to send its heartbeat messages at one second intervals, or even more often. For an N node cluster, this would require sending $(N-1)^2$ heartbeat messages every second. This heartbeat messaging traffic consumes valuable processor time within the cluster. Processor time which would be better used by user applications.

In an effort to reduce the heartbeat messaging traffic in the computer cluster 10, node_1 12, node_2 14, node_3 16 and node_4 18 are configured in a closed loop arrangement in which each node has a logical previous node and a logical next node. That is, within the status cascade 40, the previous node to node_1 12 is node_4 18 and the next node for node_1 12 is node_2 14. Each node transmits a single heartbeat message to its next node and receives a single heartbeat message from its previous node. This arrangement reduces the number of heartbeat messages in the four node cluster of the quorumless computer network cluster 10 to four heartbeat messages every predetermined time interval.

Each node 12, 14, 16, 18 in the status cascade 40 is shown to include both a message receiver 42a–42d and a message transmitter 44a–44d. In accordance with the invention, node_1 12 sends a heartbeat message from its message transmitter 44a to the message receiver 42b of node_2 14. Node_2, simultaneous with the message transmission of node_1 12, sends a heartbeat message from its message transmitter 44b to the message receiver 42c of node_3 16. Likewise, node_3 16 and node_4 18 send and receive heartbeat messages to and from their respective next and previous nodes.

Should any of the nodes 12, 14, 16, 18 fail to receive a heartbeat message from its previous node, it sends a cluster reconfiguration message from its message transmitter 44a–44d to each other node in the quorumless cluster 10. In reconfiguration mode, the quorumless cluster 10 reverts to an open loop arrangement in which each node sends a heartbeat message to each other node until node membership is once again reconciled.

In one embodiment, the ordering arrangement of the nodes can be predicated on a unique node id assigned to each node within the quorumless cluster. The nodes are ordered sequentially in the closed loop, the node having the highest node id providing its heartbeat message to the node having the lowest node id, thus serving to close the messaging loop. Other methods of ordering the nodes would also prove capable of providing a comparable closed loop arrangement, such as assigning sequential ordinal numbers to each node and arranging the closed loop based on the ordinal numbers.

As described above in conjunction with FIG. 2, the cluster manager 32, in concert with the cluster managers residing on node_2–node_4 14, 16, 18, manages cluster connectivity within the quorumless cluster 10. For the cluster managers to effectively cooperate in the connectivity management endeavor, a facility for sharing data is provided. The shareable storage device 22 of FIG. 1 houses a repository for this data sharing facility.

Figure 4:
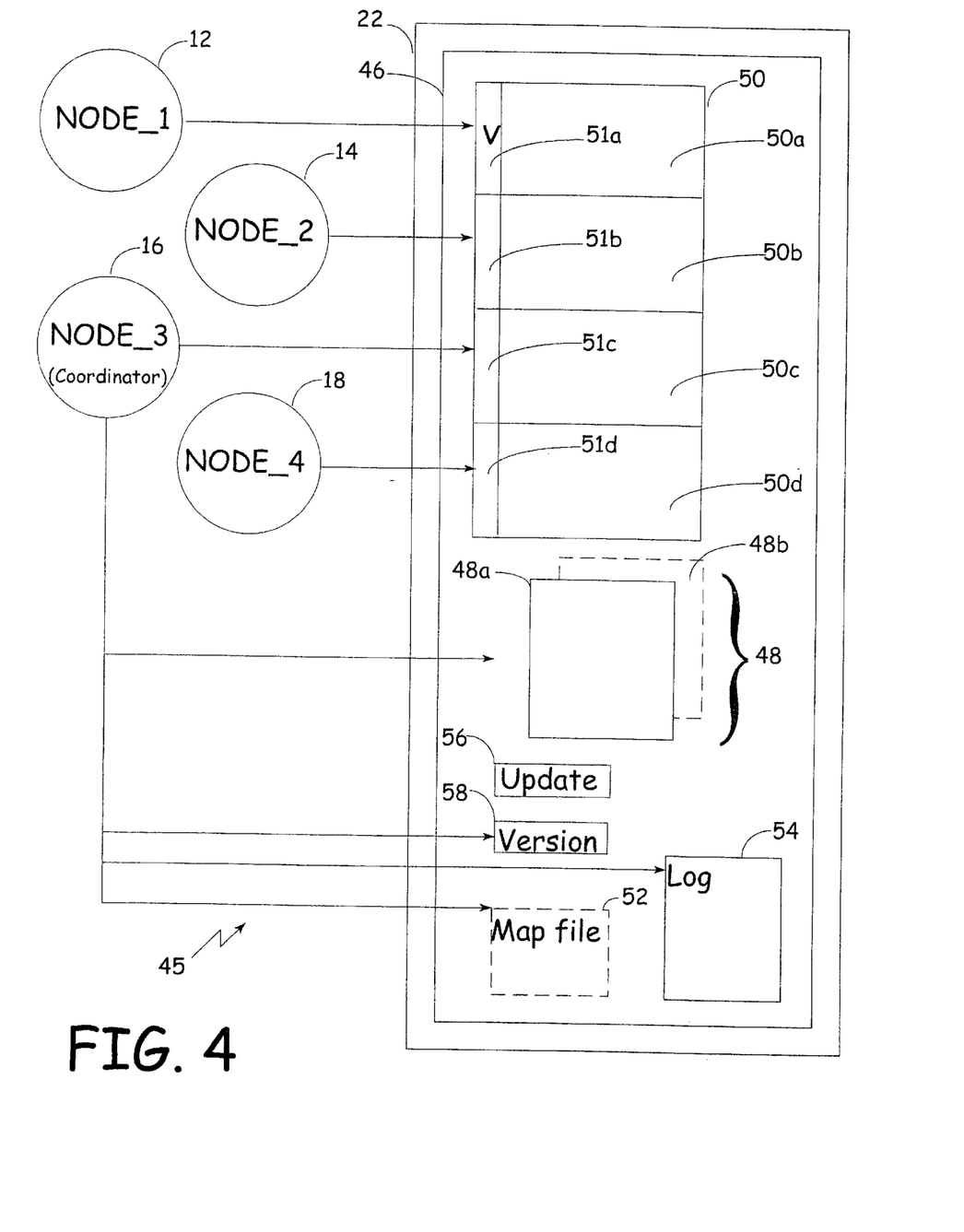
FIG. 4 is a block diagram of a repository located in the shareable storage of FIG. 1.

FIG. 4 is a block diagram of a repository located in the shareable storage of FIG. 1. Referring now to FIG. 4, the shareable storage device is shown to include, inter alia, a repository 46 which facilitates data sharing among the cluster managers for each node 12, 14, 16, 18 of the quorumless cluster 10. Node_1 12, node_2 14, node_3 16 and node_4 18 are also depicted to illustrate the areas of the repository 46 to which the cluster manager of each node is granted write privileges. The repository 46 includes, inter alia, a cluster definition 48, a scratch area 50, a map file 52, a log 54, an update in progress flag 56 and a version number 58. Each of these components may be used by the cluster managers to maintain a cluster definition for the quorumless cluster 10.

By way of background, an initial definition for a network cluster is typically provided by a cluster administrator before the network cluster is formed, by manually entering cluster parameters at a terminal to be stored in a storage device. For the quorumless cluster 10, these cluster parameters are stored within the repository 46 located in the shareable storage device 22. Examples of types of parameters which are stored to form the cluster definition include the identities of nodes which are permissible members of the network cluster, the identify of nodes which are currently operating in the network cluster and a time interval for each member node to send a heartbeat message.

Prior solutions for providing the cluster definition to each member node of a network cluster typically fell into one of two schools of thought. Under the first school of thought, a single shared copy of the cluster definition was provided for a network cluster. To determine the cluster definition, a node would be required to have network connectivity with the cluster and would then be provided, by the network connection, the cluster definition for the network cluster. A drawback to this approach is that a node needs to have network connectivity with the cluster before the node can be provided with the definition for the cluster.

Moreover, as a network cluster operates, changes to the cluster definition may be made by a cluster administrator. These changes must be communicated to each node. In the case where a node is unavailable to the cluster for a period of time, changes to the definition are stored during the nodes period of unavailability. This often requires a log file to be maintained enumerating all changes to a cluster definition made while one or more nodes within a cluster are unavailable. As nodes may occasionally be removed from the cluster for maintenance, the log file could grow to a substantial size during the period of maintenance.

Again, before the node can be provided with the definitional changes, it first needs connectivity with the network cluster. During this period of time of cluster connectivity until the latest definitional changes are communicated, the node is operating under an invalid cluster definition, possibly causing a partition in space problem which may, in turn, affect the integrity of the system.

Under the second school of thought, each node has a local copy of the cluster definition. Again, changes to the definition are communicated to each node, requiring network connectivity, so that the node may update its copy of the definition. As with the single shared definition version, there is a danger of a node operating under an invalid cluster definition and causing a partition in time problem.

According to an embodiment of the present system, a single shared copy of the cluster definition 48 is provided in the shareable storage device 22. Here, however, only access to the shareable storage device is required to access the definition rather than network connectivity with the cluster. When one of the nodes 12, 14, 16, 18 of the quorumless cluster 10 first attempts to join the cluster 10, it is provided with the location of the repository 46 in the shareable storage device 22 from which it may determine a current quorumless cluster definition. The node can access the cluster definition 48 before establishing network connectivity with the cluster.

Upon formation of the quorumless cluster 10, one of the member nodes 12, 14, 16, 18 is designated as the coordinator node. Any method of selection which yields a designation of a single node as coordinator may be used. For example, one method for selecting a coordinator node is to select the first node to join the cluster. An alternate method is to select the node having the highest, or lowest, node id. For illustrative purposes, node_3 16 has been designated as the coordinator node. The cluster manager of the coordinator node is responsible for making updates to the cluster definition 48.

As described above, changes to the cluster definition 48 are often made by a cluster administrator during operation of the cluster. Rather than providing each node 12, 14, 16, 18 with write privileges for the cluster definition 48, a single node is selected to coordinate all changes to the cluster definition 48.

In an alternate embodiment, the cluster definition is shown to include a first 48a and a second 48b copy (shown in phantom) of the cluster definition. The map file 52 (also shown in phantom) may store a designation indicating that one of these copies is a current cluster definition and the other copy is a backup cluster definition. Alternatively, either copy 48a, 48b may be accessed for the current cluster definition.

Figure 5:
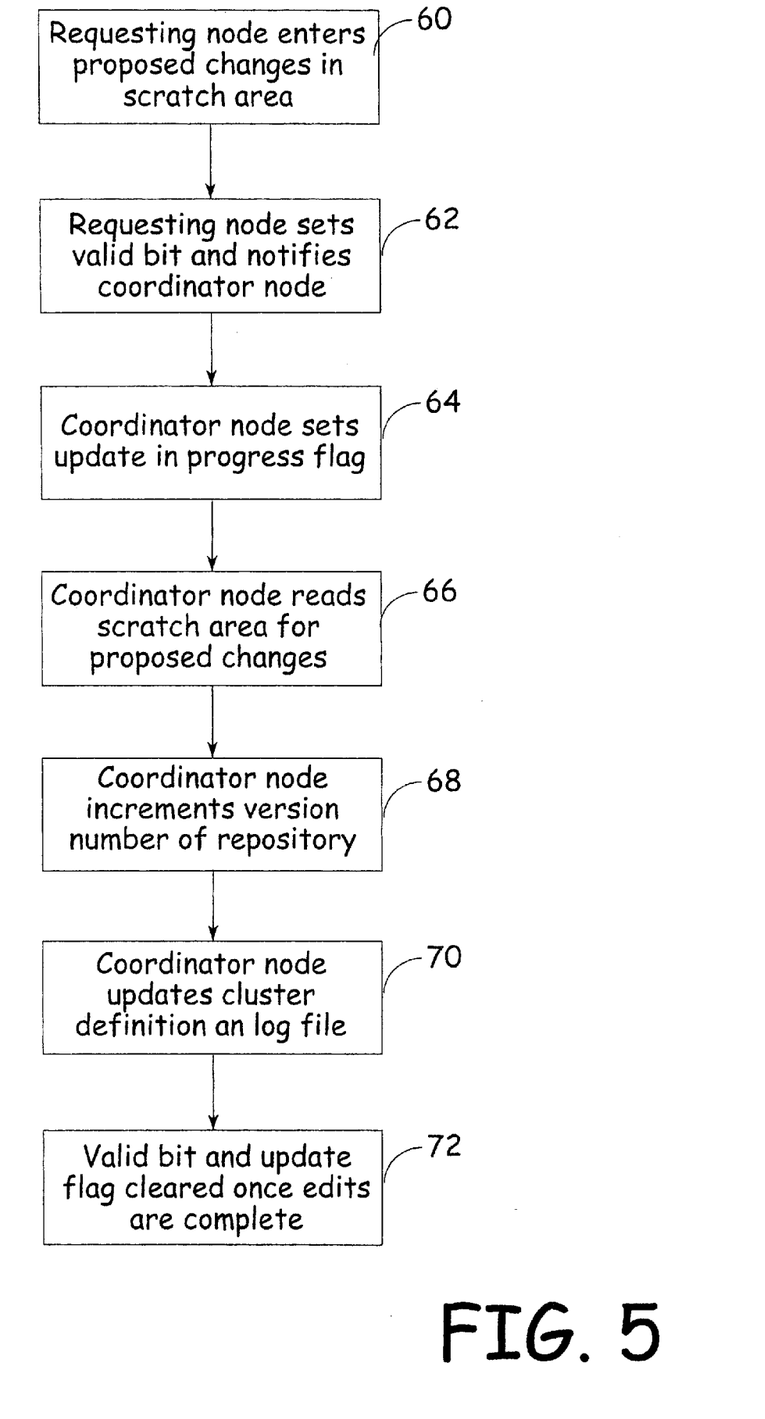
FIG. 5 is a flow diagram describing a process for updating a cluster definition stored in the repository of FIG. 4.

FIG. 5 is a flow diagram describing a process for updating a cluster definition stored in the repository of FIG. 4. A cluster administrator, connecting to the quorumless cluster 10 on node_1 12, provides one or more changes to the cluster definition 48. These changes are entered into a section of the scratch area 50 allocated to node_1 12 at step 60. The scratch area 50 is divided into four sections, each section allocated to one of the four nodes, node_1 12, node_2 14, node_3 16 or node_4 18. Each section includes an area in which cluster definition changes are entered 50a, 50b, 50c, 50d as well as a valid bit 51a, 51b, 51c, 51d.

Upon entering the proposed changes to the cluster definition 48 in the scratch area 50a, node_1 12 sets the valid bit 51a to indicate that it has completed entering its changes and notifies the coordinator node, node_3 16, that it has proposed changes to the cluster definition 48 at step 62. The coordinator node, node_3 16, verifies that the valid bit has been set and sets the update in progress flag 56 at step 64 to indicate that an update of the cluster definition 48 is in progress.

The coordinator node reads the scratch area 50a for the proposed changes at step 66 and increments the version number 58 of the repository to indicate a change is being made to the cluster definition 48 at step 68. At step 70, the coordinator node updates the cluster definition 48, to reflect the proposed changes. In addition, the coordinator node logs a progression of the update procedure in the log file 54. At step 72, the coordinator node clears the valid bit 51a and the update in progress flag 56.

As described above, the cluster definition 48 may be comprised of multiple copies. See FIG. 4. Updates to multiple copies may be accomplished in the manner described above where step 68 is implemented in parallel across all copies of the cluster definition at once.

In an alternate embodiment including multiple copies of the cluster definition, the coordinator node reads the scratch area 50a and updates a backup definition 48b (as identified by the map file 52). When the update to the cluster definition 48 has been completed, the coordinator node modifies the map file to designate the second copy 48b as the current definition and the first copy 48a as the backup definition. A timestamp is associated with the new current definition to signify a time at which the cluster definition 48 was updated. The coordinator node updates the former current definition, now backup definition 48a to reflect the proposed changes, again logging the progress of the update in the log file 54. Finally, the coordinator node clears the valid bit to indicate that the update is complete.

By writing proposed changes to the cluster definition 48 as a set by a single node, a situation in which multiple nodes are trying to make changes to the cluster definition in parallel is avoided. Parallel edits can result in a cluster definition which partially represents the changes made by a first node and partially represents changes made by a second node. That is, changes instituted by a first node may be overwritten by changes made by a second node and vice versa resulting in a cluster definition which is not representative of either node's proposed definition. In addition, by using a single node to write the changes implements a serialization primitive to coordinate cluster definition changes rather than having to use the distributed lock manager 34 (FIG. 2) of node_1 to synchronize changes to the cluster definition 48.

The log file 54 and valid bits 51a–51d provide a means by which the quorumless cluster can recover if, during an update to the cluster definition 48, the coordinator node fails to operate. Upon loss of the coordinator node, the remaining nodes, node_1 12, node_2 14 and node_4 18, of the quorumless cluster 10 select a new coordinator node.

For illustrative purposes, it will be assumed that the remaining nodes designate node_4 18 as the coordinator node. Upon designation as coordinator node, node_4 18 checks the state of the repository 46 to determine whether an update to the cluster definition 48 was left incomplete by the failure of the former coordinator node, node_3 16.

If a valid bit 51a–51d is set in the scratch area 50, the new coordinator node will examine the log file to determine whether an update had been started by the former coordinator node. If it was, the coordinator node parses the log file to determine where during the update process the former coordinator node failed. The new coordinator node completes the update from the identified point on.

As described above, a joining node needs to access the cluster definition 48 before joining the quorumless cluster 10. Here, it is assumed that node_3 16 is now attempting to rejoin the quorumless cluster 10 after its prior failure.

Figure 6:
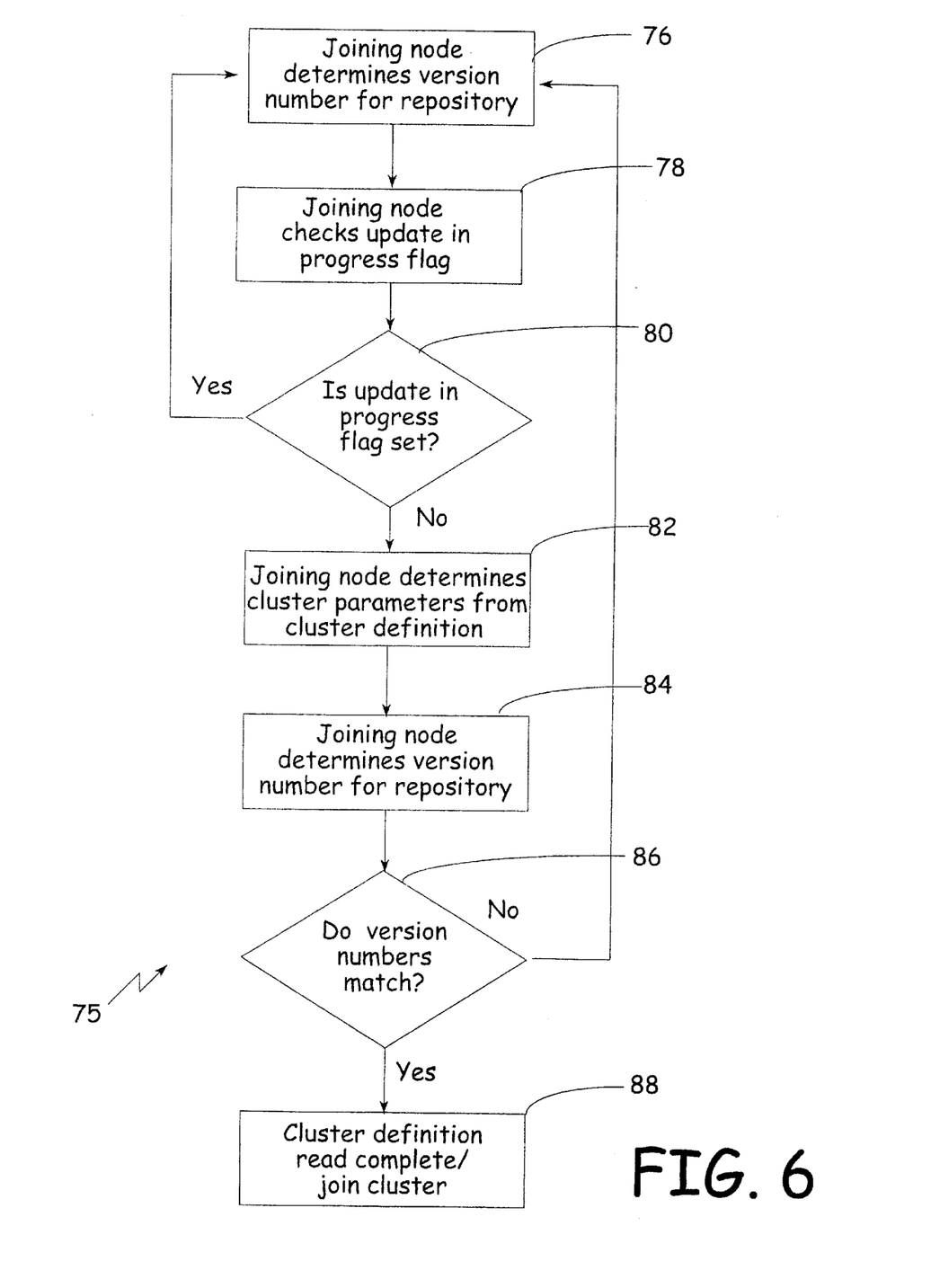
FIG. 6 is a flow diagram describing a process for reading the cluster definition stored in the repository of FIG. 4.

FIG. 6 is a flow diagram describing a process for reading the cluster definition stored in the repository of FIG. 4.

Referring now to FIG. 6, a procedure 75 for determining the current cluster definition is illustrated in flowchart format. At step 76, node_3 16, the joining node, determines the version number 58 for the repository 46. At step 78, node_3 16 checks the update in progress flag 56. If at step 80, node_3 16 determines that the update in progress flag 56 is set, node_3 16 will return to step 76, redetermine the version number 58 of the repository 46, check the update in progress flag 56 again, and cycle through steps 76 to 80 until the update in progress flag has been cleared by the coordinator node, indicating that an update to the cluster definition 48 has been completed.

At step 82, node_3 16 determines the cluster parameters from the cluster definition 48. Node_3 16, the joining node, again checks the version number 58 of the repository 46 at step 84. At step 86, node_3 16 compares the version number determined at step 76 with the version number determined at step 84 and proceeds back to step 76 if they do not match. A non-match of the version numbers indicates that an update to the cluster definition began after the joining node checked the update in progress flag 56 but was completed before the joining node rechecked the version number 58 of the repository 46. If there was a match at step 86 however, the joining node has succeeded in reading a valid cluster definition and may join the quorumless cluster 10.

As described above, the cluster definition may be comprised of multiple copies. In an alternate embodiment, node_3 16, the joining node, accesses the map file 52 (FIG. 4) to determine the location of a current cluster definition. Specifically, node_3 16 determines which of the two copies of the cluster definition 48a, 48b is the current cluster definition.

Node_3 16 proceeds to determine a first timestamp for the current definition 48b and read the cluster parameters from the current cluster definition 48b. When node_3 16 has completed reading the current cluster definition 48b, it again determines the location of the current definition. A second timestamp for the current cluster definition 48b is determined by node_3 16, which is compared to the first timestamp. If the two timestamps agree, node_3 16 read a valid cluster definition and can now join the quorumless cluster 10. If however, the timestamps do not agree, this indicates that while node_3 was reading the current cluster definition, the coordinator node, node_4 18, was in the process of updating the cluster definition 48. Accordingly, node_3 16 read a now invalid cluster definition. As a result, node_3 16 repeats the process and begins by determining the location of the current cluster definition. In this way, preference is given to a node updating the cluster definition over the node reading the cluster definition.

As described above, network connectivity between nodes in a cluster may occasionally be lost. When this occurs, there is a danger that cluster partitions, comprised of a subset of the member nodes of the cluster, may form, each cluster partition acting as the true network cluster. If the cluster partitions are allowed to continue operation, shared data may eventually be corrupted as no synchronization between the partitions is enacted for accessing the shared data. Accordingly, a single partition is selected to continue operating as the cluster while operation of the remaining one or more partitions is halted.

Figure 7:
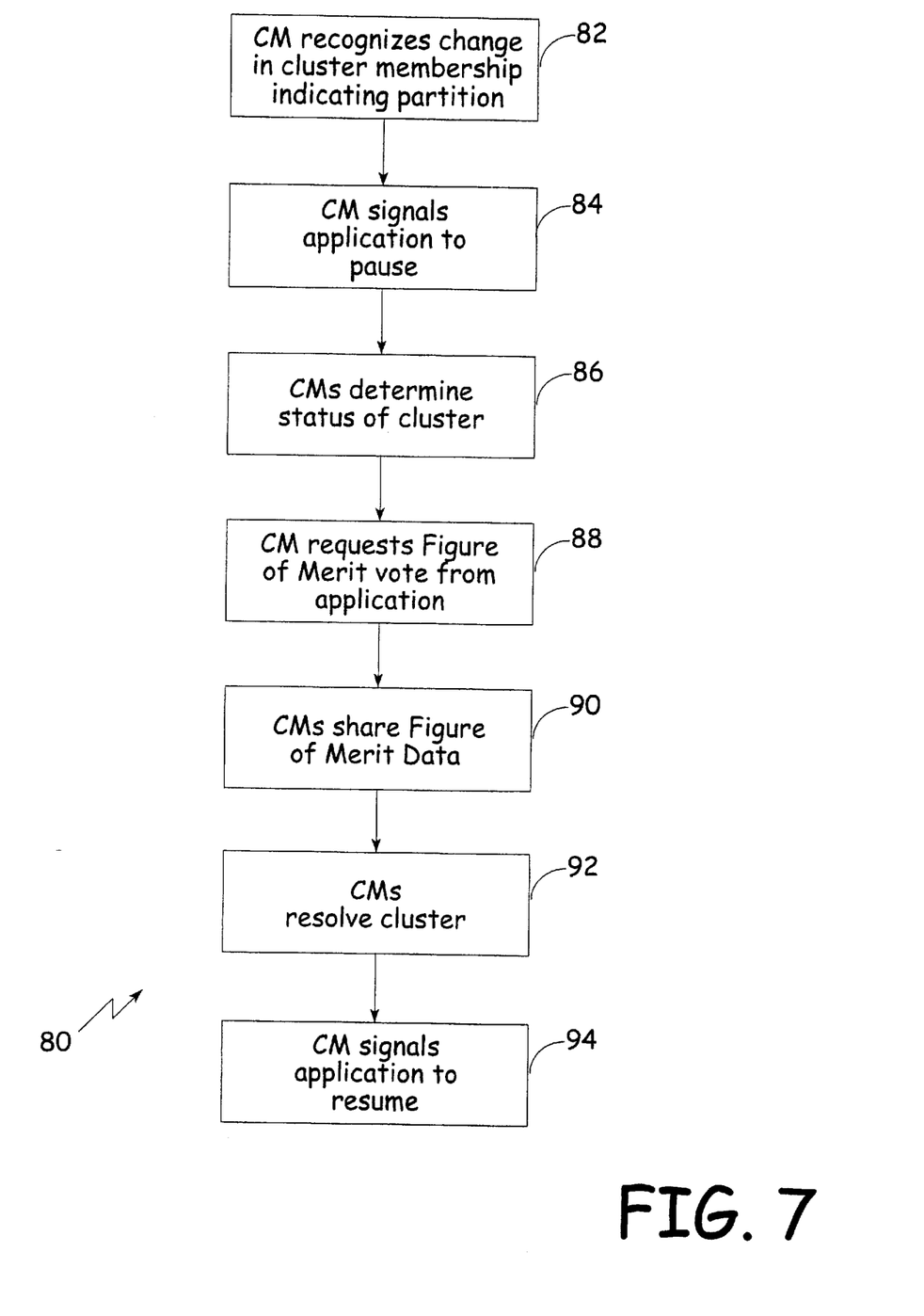
FIG. 7 is a flow diagram describing a process for resolving a partitioned cluster.

FIG. 7 is a flow diagram describing a process for resolving a partitioned cluster. Referring now to FIG. 7, a methodology 80 for resolving a partitioned cluster is illustrated in which a distributed application, executing on the quorumless cluster 10, is afforded an opportunity to provide a vote from which it is determined which cluster partition will continue operating. The methodology is shown to begin at step 82 where a cluster manager recognizes a change in cluster membership. One method for the cluster manager to recognize a change in membership indicating a partition-in-space problem is by noting changes being proposed by the nodes to the cluster definition which represent contradictory versions of the cluster membership.

It should be noted that although network connectivity may have been lost in the quorumless cluster 10, the cluster managers of each member node 12, 14, 16, 18 communicate to each other through disk based messaging, specifically through the repository 46 of FIG. 4. As described above, if a node loses access to the shareable storage 22, it removes itself from the quorumless cluster 10.

As also described above, entities, such as applications, may register with the cluster manager, to be informed of cluster membership changes. Assuming that an application executing on the quorumless cluster 10 had done so, it will be signaled by its node's cluster manager, at step 84, to pause operation.

At step 86, the cluster managers determine the status of the quorumless cluster 10. This includes sending heartbeat messages and the like among the various nodes to determine which nodes are still operating and which have network connectivity between them. At step 88, through an application program interface, (API), the cluster manager provides to the application a proposed figure of merit for the node the application is originating from. The application may accept the proposed figure of merit or propose an alternate figure of merit to the cluster manager also through use of an API.

The figure of merit is an indication of the value to the cluster manager or to the application, for its node to continue operating. The application may assess the nodes value in terms of any merit criteria the application deems appropriate. For instance, the application may determine the number of users currently executing the application and derive a figure of merit value based on number of users. Other criteria may be equally appropriate for such an evaluation such as a perceived execution priority of one application over another i.e., a payroll application vs. an accounts receivable billing application.

At step 90, the cluster managers for each of the nodes 12, 14, 16, 18 share the figure of merit data and determine, from the data, which cluster partition will continue operation. In addition to the figures of merit provided from the cluster manager and application, tie-breaker algorithms may also be employed. These tie-breakers include which nodes joined the cluster first, which node has the highest or lowest node id etc.

At step 92, based upon the decision made at step 90, the cluster managers resolve the quorumless cluster 10. Specifically, they halt operation of all non-selected cluster partitions. Once it is verified that the non-selected cluster partitions have all ceased operation, the cluster manager signals the application to resume operation at step 94.

It will be apparent to those of ordinary skill in the art that methods involved in Avoiding N-Squared Heartbeat Messaging Problem in an Operating Cluster Via Closed Loop Messaging Theme may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

It will further be apparent to those of ordinary skill in the art that, as used herein, "node" may be broadly construed to mean any computer or component thereof directly or indirectly connected or connectable in any known or later-developed manner to a computer network cluster, such as over the Internet.

While this invention has been particularly shown and described with references to certain embodiments thereof, it will be understood by those skilled in the art that various changes in form and details may be made therein without departing from the spirit and scope of the invention as defined by the appended claims.

What is claimed is:

1. A method for monitoring membership of a computer network cluster, the method comprising:

for each of at least three operating computing nodes, assigning a previous node and a subsequent node to form a closed messaging loop;

from each node, sending a respective heartbeat message toward the assigned subsequent node and scheduling receipt of a respective heartbeat message from the assigned previous node; and in response to a failure of a node to receive the respective heartbeat message from the assigned previous node, reconfiguring membership of nodes in the cluster.

2. The method of claim 1 wherein sending comprises sending a single heartbeat message to the assigned subsequent node.

3. The method of claim 1 wherein reconfiguring membership comprises sending a signal from the node toward each other node belonging to the cluster.

4. The method of claim 1 wherein sending is responsive to a specific time interval.

5. The method of claim 1 wherein reconfiguring comprises:

sending a resolve heartbeat message from each node toward each other node;

at each operating node, receiving the resolve messages; and at each operating node, configuring membership of the cluster in response to the received resolve heartbeat messages.

6. An Apparatus for monitoring membership in a network cluster, including a plurality of at least three operating computing nodes, comprising:

assignment logic for assigning each node with a previous node and a subsequent node;

for each node, membership monitor logic comprising:

a transmitter for sending an outgoing heartbeat message to the subsequent node;

a receiver for receiving an incoming heartbeat message from the previous node; and a signal source for providing a configuration signal to each node if the receiving fails to receive the incoming heartbeat message; and configuration logic responsive to the configuration signal for reconfiguring the membership of nodes on the cluster.

7. The apparatus of claim 6 wherein the transmitter sends a single heartbeat message to the assigned subsequent node.

8. The apparatus of claim 6 wherein the reconfiguration logic sends a signal from the node toward each other node belonging to the cluster.

9. The apparatus of claim 6 wherein the transmitter is responsive to a specific time interval.

10. The apparatus of claim 6 wherein the configuration logic comprises logic for:

sending a resolve heartbeat message from each node toward each other node;

at each operating node, receiving the resolve messages; and at each operating node, configuring membership of the cluster in response to the received resolve heartbeat messages.

11. A computer program product for monitoring membership of a computer network cluster, the computer program product comprising a computer usable medium having computer readable code thereon, including program code which:

for each of at least three operating computing nodes, assigns a previous node and a subsequent node to form a closed messaging loop;

from each node, sends a respective heartbeat message toward the assigned subsequent node and schedules receipt of a respective heartbeat message from the assigned previous node; and in response to a failure of a node to receive the respective heartbeat message from the assigned previous node, reconfigures membership of nodes in the cluster.

12. The computer program product of claim 11 wherein the program code further comprises instructions for sending comprises sending a single heartbeat message to the assigned subsequent node.

13. The computer program product of claim 11 wherein the instructions for reconfiguring membership comprises instructions for sending a signal from the node toward each other node belonging to the cluster.

14. The computer program product of claim 11 wherein sending is responsive to a specific time interval.

15. The computer program product of claim 11 wherein reconfiguring comprises:

sending a resolve heartbeat message from each node toward each other node;

at each operating node, receiving the resolve messages; and at each operating node, configuring membership of the cluster in response to the received resolve heartbeat messages.

16. A method of managing node membership on a computer network cluster, comprising:

defining a logical order of at least three computing nodes in the cluster, each node having a single logically previous node and a single logically subsequent node; and defining a heartbeat message protocol where each node in the cluster forwards a membership heartbeat message to its single logically subsequent node and schedules receipt of a membership heartbeat message from its single logically previous node.

17. The method of claim 16 further comprising reconfiguring the cluster in response to a failure of any node to receive a membership heartbeat message.

18. The method of claim 17 wherein reconfiguring comprises receiving a plurality of resolve heartbeat messages from each node, each resolve heartbeat message forwarded from a respective node.

19. The method of claim 18 wherein reconfiguring further comprises configuring membership of the cluster in response to the received resolve heartbeat messages.

20. The method of claim 16 wherein the cluster is a quorumless cluster.

21. The method of claim 16 wherein the heartbeat messaging protocol includes sending the membership heartbeat messages at a specific time.

22. The method of claim 21 wherein the specific time occurs at a specific time interval.

23. The method of claim 22 wherein the specific time interval is periodic.

24. A system for managing node membership on a computer network cluster comprising:
   assignment logic for defining a logical order of at least three computing nodes in the cluster, each node having a single logically previous node and a single logically subsequent node; and
   a heartbeat message protocol where each node in the cluster forwards a membership heartbeat message to its single logically subsequent node and schedules receipt of a membership heartbeat message from its single logically previous node.

25. The system of claim 24 further comprising logic for reconfiguring the cluster in response to a failure of any node to receive a membership heartbeat message.

26. The system of claim 25 wherein the reconfiguring logic comprises logic on each operating member node for resolving a plurality of resolve heartbeat messages from each node, each resolve heartbeat message forwarded from a respective node.

27. The system of claim 26 wherein the reconfiguring logic further comprises configuring membership of the cluster in response to the received resolve heartbeat messages.

28. The system of claim 24 wherein the cluster is a quorumless cluster.

29. The system of claim 24 wherein the heartbeat message protocol includes sending the membership heartbeat messages at a specific time.

30. The system of claim 29 wherein the specific time occurs at a specific time interval.

31. The system of claim 30 wherein the specific time interval is periodic.

32. A computer program product, comprising:
   a computer-usable medium; and
   computer program instructions carried on the medium to manage node membership on a computer network cluster, including instructions for:
      defining a logical order of at least three computing nodes in the cluster, each node having a single logically previous node and a single logically subsequent node;
      defining a heartbeat message protocol where each node in the cluster forwards a membership heartbeat message to its single logically subsequent node and schedules receipt of a membership heartbeat message from its single logically previous node; and
      reconfiguring membership of nodes in the cluster in response to a failure of a node to receive the membership heartbeat message.

33. The computer program product of claim 32 further comprising instructions for reconfiguring the cluster in response to a failure of any node to receive a membership heartbeat message.

34. The computer program product of claim 33 wherein reconfiguring comprises receiving a plurality of resolve heartbeat messages from each node, each resolve heartbeat message forwarded from a respective node.

35. The computer program product of claim 34 wherein reconfiguring further comprises configuring membership of the cluster in response to the received resolve heartbeat messages.

36. The computer program product of claim 32 wherein the cluster is a quorumless cluster.

37. The computer program product of claim 32 wherein the heartbeat message protocol includes sending the membership heartbeat messages at a specific time.

38. The computer program product of claim 37 wherein the specific time occurs at a specific time interval.

39. The computer program product of claim 38 wherein the specific time interval is periodic.

40. A system for monitoring membership of a computer network cluster, the system comprising:
   for each of at least three operating computing nodes, a means for assigning a previous node and a subsequent node to form a closed messaging loop;
   from each node, a means for sending a respective heartbeat message toward the assigned subsequent node and a means for scheduling receipt of a respective heartbeat message from the assigned previous node; and
   in response to a failure of a node to receive the respective heartbeat message from the assigned previous node, a means for reconfiguring membership of nodes in the cluster.

41. The system of claim 40 wherein the sending means comprises sending a single heartbeat message to the assigned subsequent node.

42. The system of claim 40 wherein the reconfiguring membership means comprises a means for sending a signal from the node toward each other node belonging to the cluster.

43. The system of claim 40 wherein the sending means is responsive to a specific time interval.

44. The system of claim 40 wherein the reconfiguring membership means comprises:
   a means for sending a resolve heartbeat message from each node toward each other node;
   at each operating node, a means for receiving the resolve messages; and
   at each operating node, a means for configuring membership of the cluster in response to the received resolve heartbeat messages.

45. A system for managing node membership on a computer network cluster, the system comprising:
   a means for defining a logical order of at least three computing nodes in the cluster, each node having a single logically previous node and a single logically subsequent node; and
   a means for defining a heartbeat message protocol where each node in the cluster forwards a membership heartbeat message to its single logically subsequent node and a means for scheduling receipt of a membership heartbeat message from its single logically previous node.

46. The system of claim 45 further comprising a means for reconfiguring the cluster in response to a failure of any node to receive a membership heartbeat message.

47. The system of claim 46 wherein the reconfiguring means comprises a means for receiving a plurality of resolve heartbeat messages from each node, each resolve heartbeat message forwarded from a respective node.

48. The system of claim 47 wherein the reconfiguring means further comprises a means for configuring membership of the cluster in response to the received resolve heartbeat messages.

49. The system of claim 45 wherein the cluster is a quorumless cluster.

50. The system of claim 45 wherein the heartbeat messaging protocol includes a means for sending the membership heartbeat messages at a specific time.

51. The system of claim 50 wherein the specific time occurs at a specific time interval.

52. The system of claim 51 wherein the specific time interval is periodic.

* * * * *